United States Patent Office 3,124,891
Patented Mar. 17, 1964

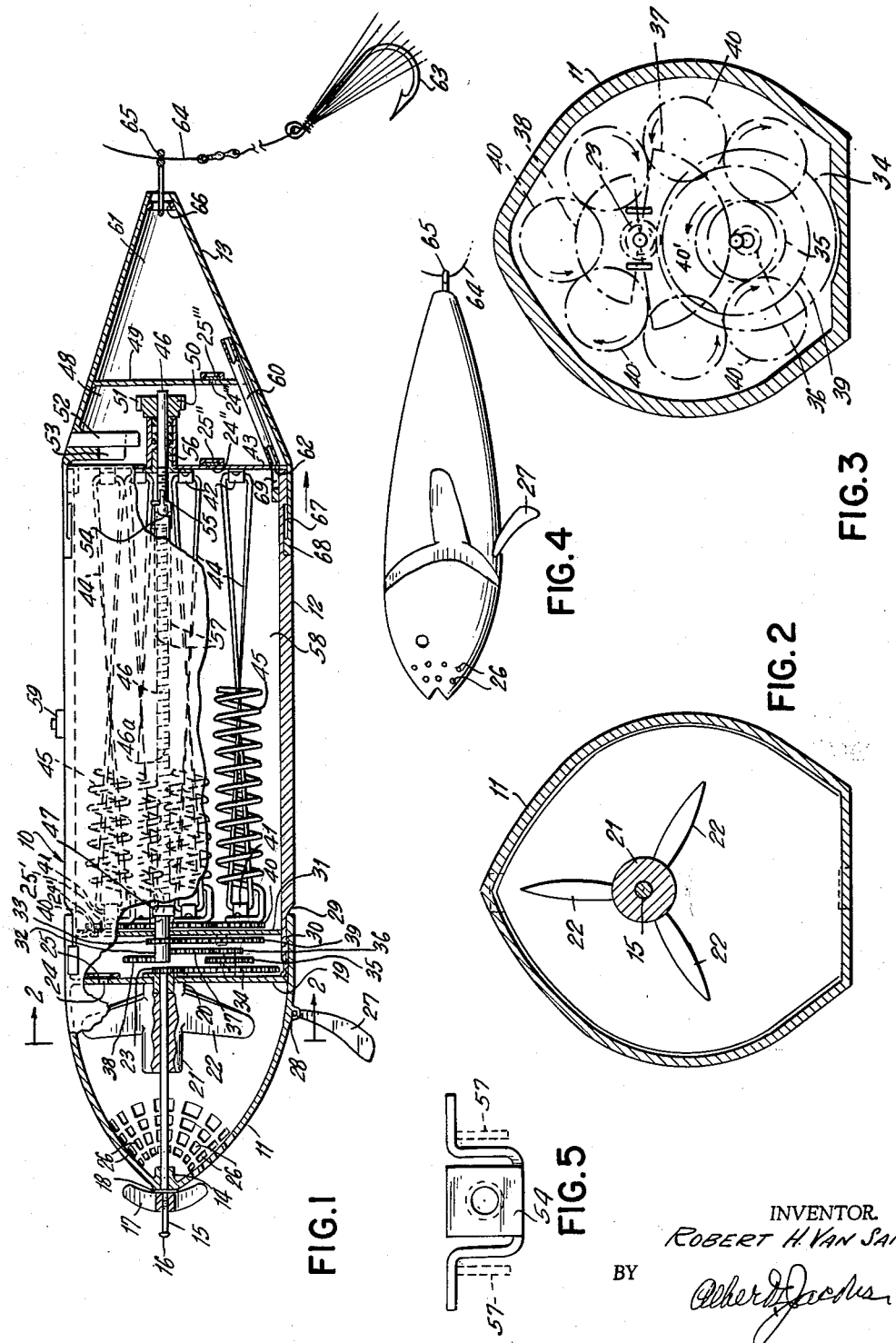

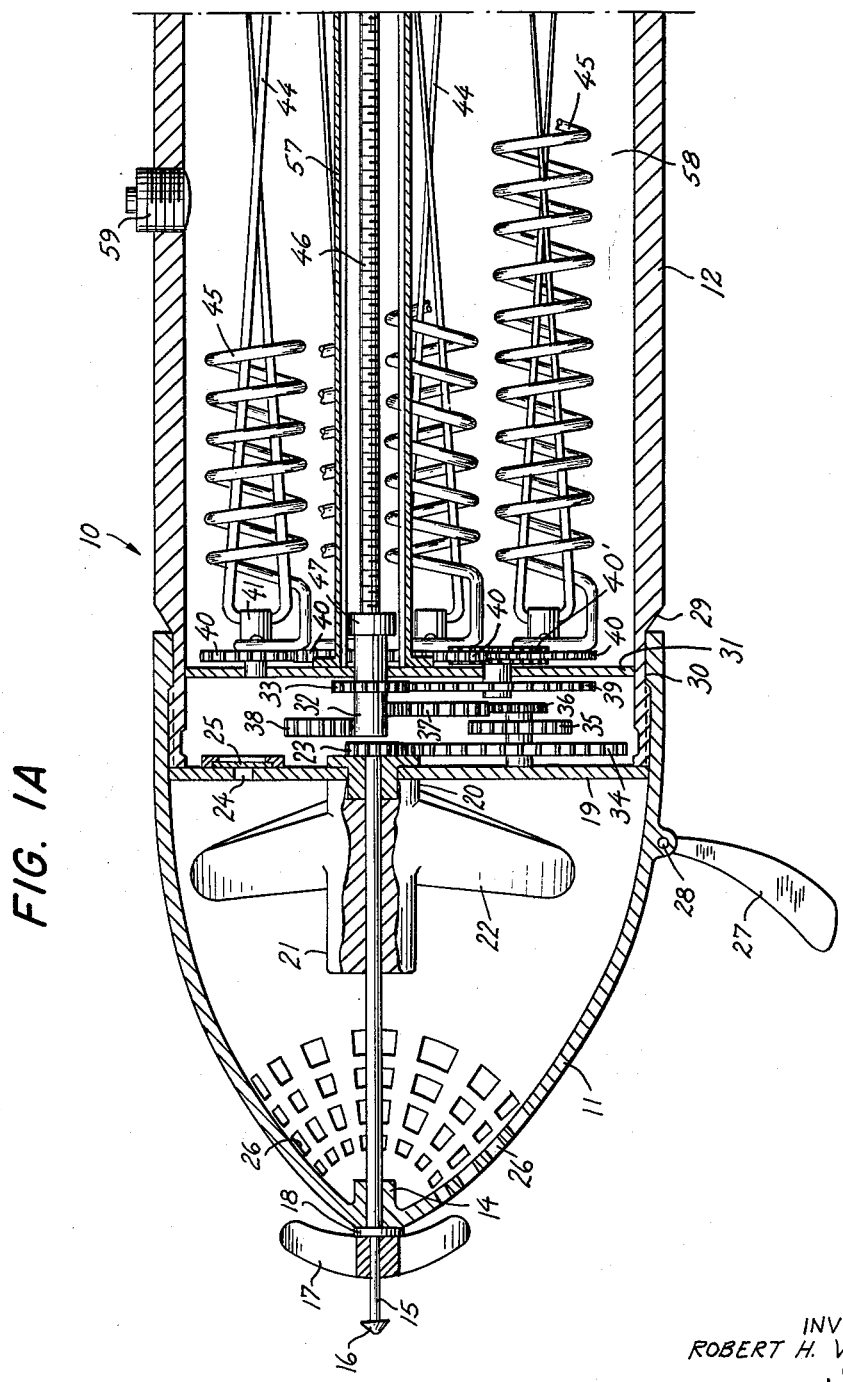

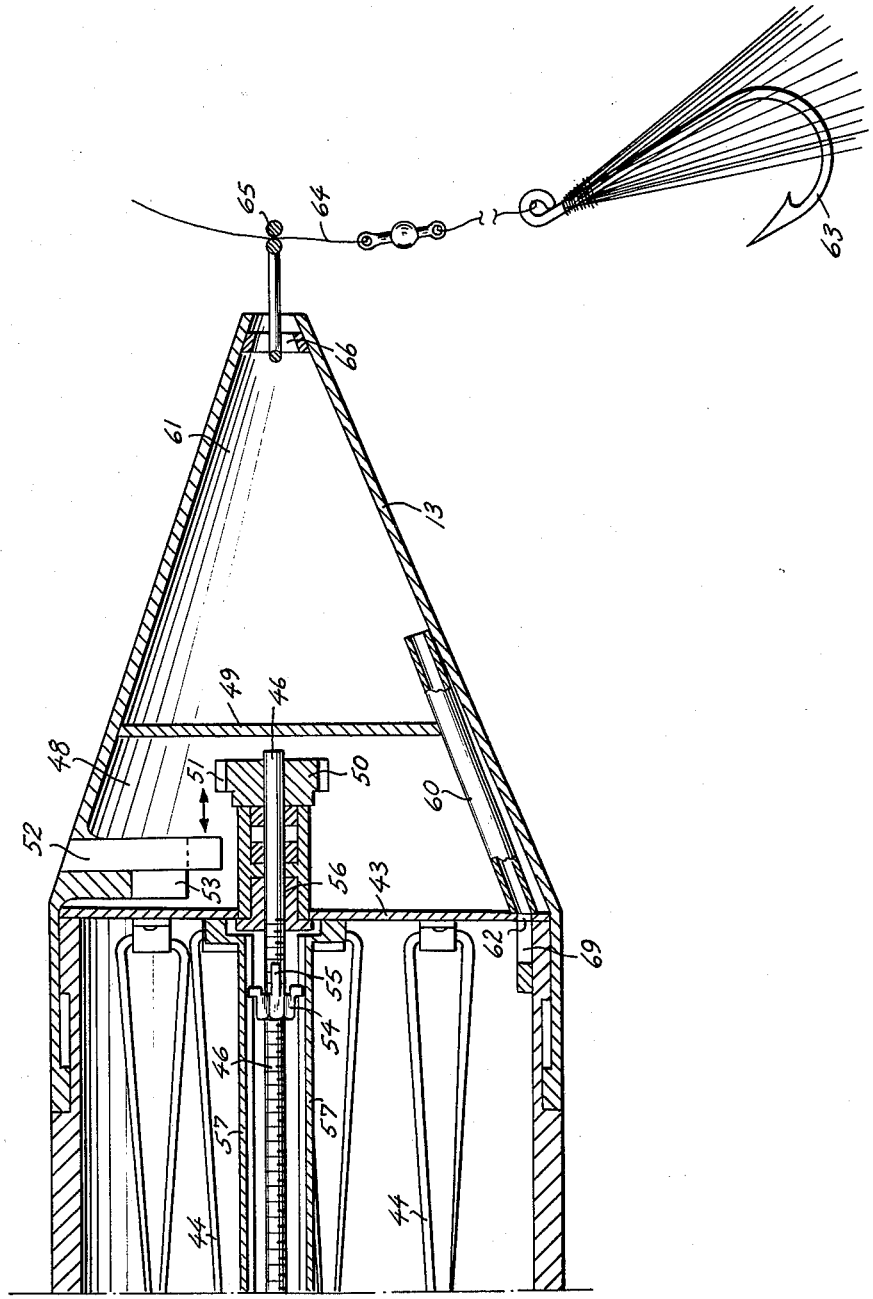

3,124,891
LURE FOR GAME FISH
Robert H. Van Sant, 434 Sea Spray Ave.,
Palm Beach, Fla.
Filed Feb. 26, 1962, Ser. No. 175,569
8 Claims. (Cl. 43—26.2)

The present invention relates to a lure for game fish and more particularly to a compartmented fish-shaped lure a compartment of which is provided with mechanical propulsion means in which twistable and untwistable elastic elements act on a set of interrelated gears driving an impeller.

Fish lures are known which are self-propelling but these usually operate on the principle of generating gas which when expelled causes forward movement of the lure in water. Such have only a rather short life in that the generation of the gas is not of long duration and replacement cartridges have to be substituted from time to time. Such propulsion means is further apt to be erratic and not subject to practical control.

An object of the present invention is to provide a fish lure which has a rather simple mechanical propulsion means requiring a minimum of manual attention and which operates by driving an impeller from gears actuated by wound elastic elements which generate power by their change from twisted to untwisted condition.

Another object of the invention is to provide a three part lure shell in which the motive means is in a central cylindrical section, the impeller is in a forward or head section and blood is released through a rearward or tail section and is shut off automatically when a "strike" occurs due to a fish being hooked and exerting a drag on the lure.

Other and further objects and advantages will be appreciated or understood hereinafter.

In the accompanying drawings:

FIG. 1 is a longitudinal medial section of the new lure partly in elevation.

FIG. 1A is an enlarged longitudinal medial section of the front end of the lure.

FIG. 1B is an enlarged longitudinal medial section of the rear end of the lure.

FIG. 2 is a transverse section on line 2—2 of FIG. 1 looking in the direction of the arrows.

FIG. 3 is a view similar to FIG. 2 but showing the gear arrangement diagrammatically.

FIG. 4 is an elevational view of the entire lure on a reduced scale wherein the shell is covered by a skin of any suitable material to enhance the resemblance to a fish.

FIG. 5 is an elevational front view of the overwind nut.

The shell 10 is made in three parts comprising a head section 11, a central cylindrical section 12 and a tail section 13. These sections are held together by friction fits as shown and may be composed of any desired material such as aluminum, plastic or other metallic or non-metallic material and wherein the total weight of the lure is such that it will operate either at or a little below the surface of the lake, ocean, bay, inlet, etc., or at any required submerged level depending on the type of fishing being carried out.

The head section 11 has a nose boss 14 with an axial bore for the passage of impeller shaft 15 which has an enlargement 16 at its outermost end and on which shaft forward of the boss there is fixed a wing-nut-like winding element or key 17 for turning the shaft manually. An annular washer 18 is preferably located between key 17 and the nose of head section 11. Near the rear of head section 11 is a transverse bulkhead 19 with a central aperture for the reception of a hub 20 of impeller 21 the blades 22 of which are designed and cambered to give forward motion to the lure when the blades are rotated. Shaft 15 passes through the impeller which is fixed thereto and also through bulkhead 19 and has a pinion gear 23 secured at its inner end.

Bulkhead 19 also has a one-way valve therein which is, for example, comprised of an opening 24 backed by a flap or diaphragm valve 25 so that water can flow through during forward motion of the lure which causes the valve to open but closes when rearward pressure thereagainst is reduced. The forward part of head section 11 is also provided as shown with rows of water inlet apertures 26 preferably but not necessarily increasing in area from row to row in a rearward direction. Thus, in operation, water passes through water inlet apertures 26 into head section 11, is forced rearward by the motion of impeller 21 through valve controlled opening 24 and 24' into the cylindrical section 12 and through valve controlled openings 24" and 24''' into tail section 13. If the blood reservoir is filled, the water passes along with the dried blood which becomes solubilized through conical chamber 61 of tail section 13 when aperture 62 in bulkhead 43 is open. This aperture will be open during normal operation until it is closed when a "strike" is made by a fish being hooked at 63 and pulling tail section 13 rearward. If the blood reservoir is empty, the water will pass through in like fashion only without any blood accompanying it. Head section 11 is further preferably provided with one or more external movable or detachable fins 27 which can be used for directional guidance of the lure. In the embodiment shown, fin 27 is pivoted at 28 to section 11 but can be set at any desired angular relationship to the lure body.

The central cylindrical section 12 is thinned at 29 around its forward portion so that the rearward portion of head section 11 fits thereover and snaps in position and the overlapping portions are held against accidental disassembly by interengaging shoulders 30. Bulkhead 31 is located near the forward end of section 12 and has an axial stub shaft 32 mounted therein on which is a centre gear 33. Pinion gear 23 is in mesh with gear 34 mounted on the rear face of bulkhead 19 and the gear spindle carries gears 35 and 36 the latter of which is in mesh with partial gear 37 and the former of which meshes at each revolution with partial gear 38 carried by stub shaft 32.

Gear 33 is connected to gear 39 mounted on the forward face of bulkhead 31. Around that portion of stub shaft 32 which projects into section 12 are a series of gears 40 arranged in planetary or epicyclic manner and all in mesh and connected to each such gear 40 is a bracket 41 opposite to a similar bracket 42 secured on the forward face of bulkhead 43 at the rearward end of section 12. Strung between each pair of brackets 41, 42 is an elastic member 44 which can be twisted and untwisted many times in the general manner of a rubber band. A particularly suitable material is a ¼" diameter rubber cord made by U.S. Rubber Company. This material has a specific gravity of 1.20±5, a tensile strength of 2300 p.s.i., an elongation of 400% and is known under #2357 with a durometer test of 40. One hundred feet weigh 2.4 pounds. The foregoing gearing arrangement is provided as a means for transmitting the power from the untwisting and retwisting elastic members 44 to the impeller 21 as well as providing a means for the initial twisting of the elastic members via key 17. The connection and mesh of these gears is such that the lure proceeds with a non-uniform motion, thus simulating the actual movement of a fish. A helical wire spring 45 encircles the forward portion of each elastic member 44 and has its forward end secured on or adjacent bracket 41 with its rear end terminating about at or slightly rearwardly of that point of the elastic member where crossover occurs, as will be evident from FIG. 1. Said helical wire acts as a confiner to elastic members 44.

A brake shaft 46 having threads 46a over its entire length and having enlargement 47 at its forward end where it is connected to stub shaft 32 extends axially rearwardly through section 12 into tail section 13, terminating in compartment 48 between bulkhead 43 and bulkhead 49 and on the rearward end of shaft 46 is a brake wheel 50 having peripheral detents 51 adapted to be engaged, when tail section 13 is pulled rearward either manually or when a fish is "hooked" by flexible stop blade 52, flexible in the wind-up direction only. The elastic members 44 are wound up by means of shaft 46 by wind-up key 17 already referred to. Key 17 is internally threaded and when it is brought into full engagement with the impeller shaft 15, the key bottoms or abuts against washer 18 or a shaft shoulder slightly forward of the washer. Thus, further rotation of the key causes the impeller shaft and hence the train of gears to turn, thereby winding up the elastic webs. Flexible stop 52 permits wind-up by ratcheting over the brake wheel detents. Backstop 53 prevents the brake wheel from rotating in the unwind direction. Shaft 46, which rotates during wind-up, is provided with a special nut 54 arranged so that as the elastic members are wound up the nut travels rearwardly until sufficient twist is imparted to the elastic members 44 whereupon extensions 55 of nut 54 contact the face of sleeve 56 at bulkhead 43, thereby locking shaft 46 and preventing overwind of the mechanism. Nut 54 is restrained from rotation by stiffener rails 57 which extend from bulkhead 43 on either side of shaft 46. The enlargement 47 previously referred to serves as a limiting stop for travel of nut 54 during unwind.

The cavity 58 of section 12 provides a reservoir for blood storage and blood inlet and vent cap 59 provides means for filling the reservoir. Blood can pass through tube 60 into the conical chamber 61 of tail section 13 when aperture 62 in bulkhead 43 is open. The slot can be closed when tail section 13 is pulled rearwardly as when a "strike" is made by a fish being hooked by hook 63 on fish line 64 which passes through eye or loop 65 anchored by ring 66 in the small open end of tail section 13 or when the tail section 13 is pulled backwardly by hand. Such is made possible by an annular external groove 67 in the rearward periphery of section 12 in which the shouldered enlargement 68 of section 13 can ride rearwardly and the slotted tube extension 69 at the same time can slide back to close the mouth of tube 60 by blocking aperture 62.

It is understood that the details of construction may be modified without departing from the spirit or scope of the invention as defined by the appended claims. While the new lure is particularly adapted for fresh water fishing it is, of course, not limited thereto. The operation of the lure will be clear from the foregoing and it is pointed out that it can be used over and over indefinitely and that the rubber cords can be readily replaced should it become necessary to do so. It will further be appreciated that the elastic members 44 continue to wind and unwind again and again for a protracted period of time thus giving the lure unusual range and distance.

What is claimed is:

1. A lure for game fish comprising a central cylindrical section, a head section overlappingly fitted to the forward end of said central section and a tail section overlappingly fitted over the rearward end of said central section and movable with respect thereto, said head section being provided with a plurality of openings adapted for the passage of water therethrough, said central section being adapted to contain blood and said tail section having an opening in its rearward end for the discharge thereof, a plurality of rubber cords mounted in said central section adapted to be twisted to impart motive energy thereto and which during untwisting release said energy, a series of meshing planetary gears turned as said rubber cords twist and untwist, an impeller in said head section connected to said planetary gears, an impeller shaft having a pinion gear on its rearward end in mesh with intermediary gears connected to said planetary gears and extending forwardly beyond the nose of said head section, a winding key on said impeller shaft just forwardly of said head section, a shaft extending axially through said central section and having its forward end operatively associated with said planetary gears and its rearward end extending into said tail section, a brake wheel on the rearward end of said last-named shaft and having peripheral detents and a flexible member mounted in the tail section normally out of engagement with said detents but adapted to engage said detents when said tail section is moved rearwardly and a blood tube disposed in said tail section one end of which normally communicates with the interior of said central section but is adapted to be placed out of communication with the interior of said central section and the other end of which is in communication with said opening in said tail section.

2. A lure for game fish in accordance with claim 1 in which the rearward portion of the central cylindrical section is provided with an external annular groove and the tail section where it overlaps said central section is provided with a shouldered enlargement adapted to move in said groove in a direction longitudinal of the lure.

3. A lure for game fish in accordance with claim 2 in which a member is provided on the inner rearward surface of said central section connected to and movable with said tail section so that when said shouldered enlargement moves rearwardly of said annular groove said member closes the mouth of said tube.

4. A lure for game fish in accordance with claim 1 in which said central cylindrical section has a transverse bulkhead at each end thereof, opposed pairs of brackets mounted on the inner surfaces thereof for holding said rubber cords and a helical spring encircling each rubber cord from a point adjacent its forward end to a point just beyond where the rubber cords cross over.

5. A lure for game fish comprising a central cylindrical section, a head section and a longitudinally movable tail section which partially overlap opposite ends of the central cylindrical section and are connected thereto, motive energy means located in said central cylindrical section, an impeller located in said head section, mechanical energy transmission means located in the forward portion of said central cylindrical section, said means being connected at its rearward end to said motive energy means and at its forward end to said impeller, and braking means integrally connected with said motive energy means and said energy transmission means and extending into said tail section.

6. A lure for game fish according to claim 5 wherein said motive energy means comprises a plurality of rubber cords adapted to be twisted and untwisted to store and deliver power, said mechanical energy transmission means including a gear train intermediate the rubber cords and the impeller and mechanically connected therewith.

7. A lure for game fish according to claim 6 wherein said braking means is constructed to hold said rubber cords in their twisted position when said tail section is moved rearwardly and to release them for propelling said lure irrespective of the extent of twist existing in the rubber cords when forward motion of said lure is arrested.

8. A lure for game fish according to claim 7 wherein said head section is provided with a plurality of openings through which water is adapted to pass, a transverse bulkhead separating said head section and said central cylindrical section, a one-way valve located in said bulkhead through which said water passes from said head section into said central cylindrical section, a blood reservoir located in said central cylindrical section, a blood tube mounted in said tail section to receive blood from said reservoir and to discharge it together with said water via an axial end opening in said tail section, and a slotted tube extension slidably connected to the forward end of said blood tube, said slotted tube being adapted to slide with the tail section relative to the central cylindrical section to close the blood tube and prevent further passage of blood upon rearward movement of the tail section.

References Cited in the file of this patent

UNITED STATES PATENTS

| Re. 18,359 | Nelson | Feb. 23, 1932 |
| 1,390,601 | Caldwell | Sept. 13, 1921 |
| 2,511,154 | Garland | June 13, 1950 |
| 2,854,776 | Van Sant | Oct. 7, 1958 |